United States Patent

[11] 3,627,342

[72] Inventor Francois Morellet
  Cholet, France
[21] Appl. No. 885,732
[22] Filed Dec. 17, 1969
[45] Patented Dec. 14, 1971
[73] Assignee Societe Anonyme dite: Morellet-Guerineau
  Cholet, France
[32] Priority June 16, 1969
[33] France
[31] 6920002

[54] COLLAPSIBLE BABY CARRIAGE
  5 Claims, 4 Drawing Figs.
[52] U.S. Cl. .................................................. 280/36 B
[51] Int. Cl. ..................................................... B62b 11/00
[50] Field of Search .......................................... 280/36 B, 41

[56] References Cited
  UNITED STATES PATENTS
  1,779,742  10/1930  Lines .......................... 280/36 B
  3,173,704  3/1965  Boudreau .................... 280/36 B
  FOREIGN PATENTS
  502,476  4/1951  France ........................ 280/36 B Primary Examiner—Leo Friaglia
Assistant Examiner—Robert R. Song
Attorney—Holcombe, Wetherill & Brisebois ABSTRACT: Baby carriage having an X frame, the members of which are pivotally connected, and a U-shaped spring suspension. The lower ends of the X are slidably attached to the arms of the U. When the X is short and tall, the frame tensions the spring members of the suspension and projects above it. When the X is wide and short, the frame slides down on the arms of the U so that it may be stored at a minimum height.

COLLAPSIBLE BABY CARRIAGE

SUMMARY OF THE INVENTION

This invention relates to a baby carriage equipped with a spring suspension, the frame of which is adapted to fold to facilitate storage and transportation of the carriage. The frame of such carriages ordinarily comprises, on each side of the carriage, two members which are pivotally attached to each other to form an "X." One of these members carries the handle or push bar of the carriage pivotally attached thereto. When this handle is swung over, the "X" may be folded flat at the same time that the lower ends of the two members are separated. These ends are hooked to straps which are fastened to the springs and when the ends are separated the spring is relaxed so that the frame may drop down between the springs. However, even when the frame is folded in this manner, it usually continues to project above the space embraced between the springs.

The purpose of the invention is to provide a device which makes it possible to seat the folded frame completely inside the space embraced by the suspension springs without requiring the two parts to be separated from each other.

The invention consists in arranging the end of each spring in such a manner that, after release of the tension on the straps due to folding of the frame, the attaching ring on each strap can slide on the corresponding spring for a certain portion of the length of the spring, without becoming separated therefrom, so as to permit a certain lowering of the frame.

This result may be obtained by simply forming the hooks at the end of the springs so that they project toward the outside of the curve and leaving them open, or forming the hooks so that they project toward the inside of the curve and elongating them by a segment which parallels the spring and is closed at the bottom.

In order that the invention may be better understood a preferred embodiment thereof will now be described, purely by way of illustration and example, with reference to the accompanying drawings, on which:

Figure 1:
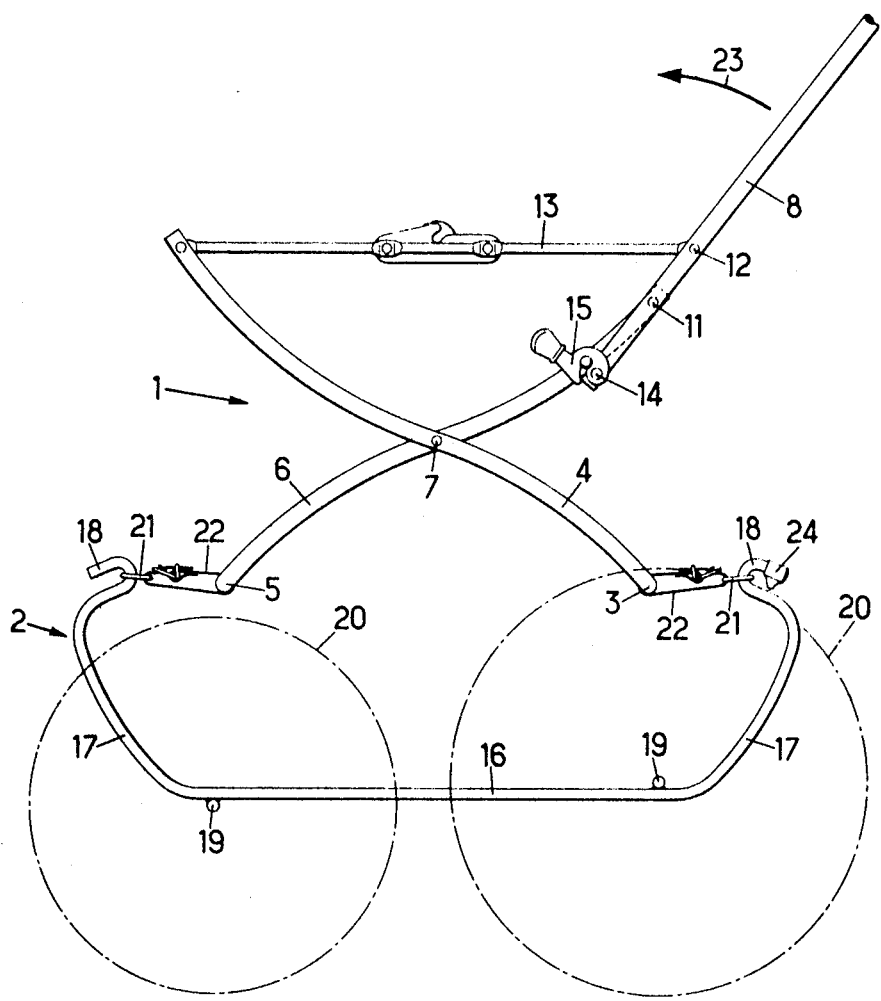
FIG. 1 is an elevational view showing the essential parts of the carriage.

The carriage comprises a folding frame 1 and a spring suspension 2. The frame consists of three U-shaped tubular members which are pivotally attached to each other. The first of these members comprises a horizontal part 3 connecting two lateral arms 4. The second member likewise comprises a horizontal part 5 connecting two lateral arms 6, which are pivotally connected to the arms 4 near their midpoint by means of a pivot pin 7 at each side. The third member, which constitutes the handle or push bar, comprises two arms 8 connected by a horizontal part 9 and circled by a sleeve 10. The arms 8 are pivotally attached at 11 to the upper ends of the arms 6 and at 12 to the rear ends of two rails 13, each of which is pivotally attached at its front end to the upper end of the arms 4. These rails serve to support the cloth portion of the carriage, which is not shown. At the end of the arms 8, locking members 13 are pivotally attached at 14, so that the assembly may be locked to the arms 6 in the position shown in FIG. 1.

The frame 2 also comprises two springs 16, the curved ends 17 of which terminate in hooks 18 and two axles 19 which are welded transversely to these springs and are adapted to support removable wheels 20. Each of the hooks 18 is fastened to a ring 21 through which passes a strap 22 attached to the corner formed between the horizontal part 3 or 5 and the corresponding oblique arm 4 or 6.

Figure 2:
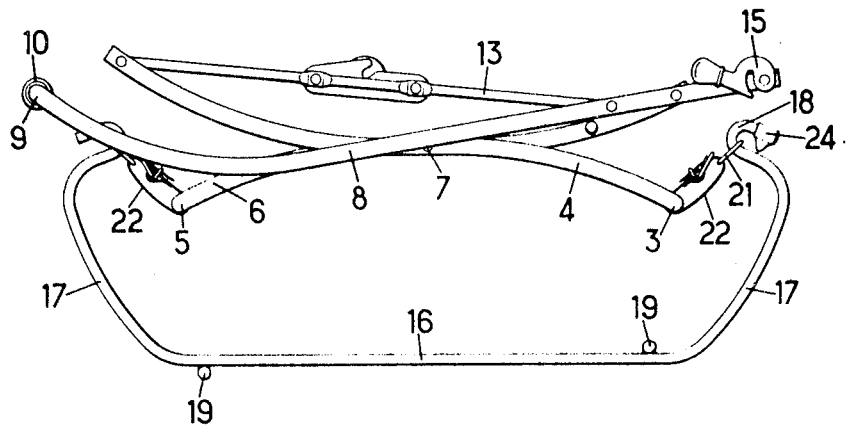
FIG. 2 shows the carriage after the wheels and cloth portions have been removed and the handle folded back.

By unhooking the two locking members 15 and swinging the handle 8 in the direction indicated by the arrow 23 in FIG. 1, the frame may be folded in a conventional manner into the shape shown in FIG. 2. It will be seen that the assembly nevertheless occupies a considerable space, especially in the case of very comfortable carriages for which the springs 16 necessarily have curved parts 17 of a considered length.

It is then possible, according to the invention, to still further reduce the space occupied, by providing hooked ends 18 at the upper ends of the springs, which do not extend toward the inside of the curve as usual, and leaving them open instead of closing them in a conventional manner.

Figure 3:
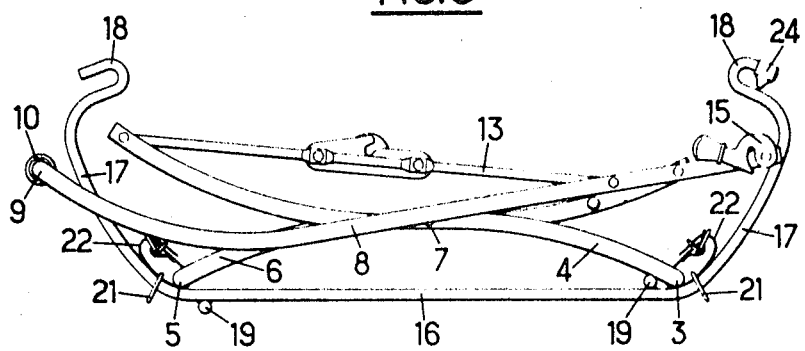
FIG. 3 shows the carriage after the suspension rings have been slid down on the springs.

As a consequence of this arrangement after having folded the frame as shown in FIG. 2, it is possible to slide each of the rings 21 successively down the curved portion 17 of the corresponding spring in order to bring the assembly into the position shown in FIG. 3. The folding of the frame in a conventional manner moves the horizontal parts 3 and 5 apart so as to release the tension on the springs and straps 22. It is this release of tension which permits the sliding by the rings 21.

It will thus be seen, by comparing FIGS. 2 and 3, that the space finally occupied is strictly limited to that encompassed by the springs, since the entire frame assembly is seated inside this space.

Conversely, in order to return the carriage to its position of use, it suffices to slide the two rings 21 at one side of the frame along the curved arm 17 toward the top until these rings are within the hooks 18. The same thing is then done at the other end of the frame, and in order to prevent the first end of the frame from falling down during this second operation, a rubber or plastic stop member 24 may be mounted at the end of one of the hooks 18 in order to resist passage of the corresponding ring toward the bottom. After having repositioned the four rings 21, the frame 1 may be unfolded by swinging the handle 8 backward in a conventional manner to bring it into the position shown in FIG. 1, after which it is only necessary to replace the rings 20 and the cloth portion in order to prepare the carriage for use.

Figure 4:
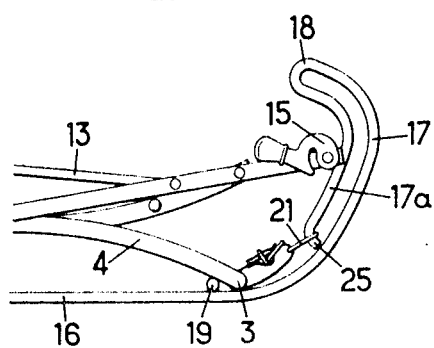
FIG. 4 is a fragmentary view of an alternative embodiment of the invention.

Alternatively, it is possible, as shown in FIG. 4, to turn the hooked ends 18 of the springs 16 inwardly in a conventional manner, but without closing them. They must instead be elongated by a curved portion 17a which parallels the curved arm 17 and terminates in a stop 25 which closes the curve. In this case each of the rings 21 may slide along the curved part 18 up to the stop 25 by following the part 17a instead of the arm 17.

In both cases it will be seen that the carriage may be converted from its position of use to its completely folded position by relatively simple movements without ever separating the frame 1 from the suspension 2, thus materially simplifying its handling, and in particular the storage of the folded carriage in the trunk of an automobile.

The invention thus makes it possible to provide a carriage which is particularly comfortable which nevertheless occupies a limited space when folded without any increase in its cost.

It will of course be appreciated that the embodiments which have been described have been given purely by way of example, and may be modified as to detail without departing from the basic principles of the invention as defined by the following claims.

What is claimed is:

1. In a folding baby carriage comprising a frame and a spring suspension, said frame having members pivotally connected to each other in such a way that the height of said frame may be decreased and its length increased by swinging said members relative to each other, and said suspension means including spring members having upwardly projecting end portions, and means attaching one end of each frame member to one of said projecting end portions, said frame being dimensioned to tension said spring members when its length is reduced, but permit relaxation of said spring members when its length is at a maximum, the improvement comprising outwardly curved guide means integral with each end portion of said spring members, said attaching means comprising a ring mounted on said guide means for sliding movement between an upper spring-tensioning position occupied when the length of said frame is reduced and a lower position occupied when the length of said frame is at its maximum, in which said spring is permitted to relax and the top of said frame is lower with respect to said spring ends than when ring is in its upper position.

2. Carriage as claimed in claim 1 comprising means for locking said frame in a position at which its height is greater than its minimum height and in which it tensions said spring members.

3. Carriage as claimed in claim 1 in which each upwardly projecting end portion is first curved to define said guide means, and then bent to form an outwardly open hook which holds the corresponding ring when in its upper position.

4. Carriage as claimed in claim 1 in which each end portion of said spring is bent inwardly and downwardly to form a closed generally vertical loop constituting said guide, with the upper ends of said loop preventing the movement of said ring beyond its upper and lower positions respectively.

5. Carriage as claimed in claim 1 comprising yielding stop means carried by said guide means and positioned to resist sliding movement of said ring in one direction relative to the said guide means.

* * * * *